(No Model.)
F. FONTNEAU.
ORNAMENTAL CHAIN.
No. 300,241. Patented June 10, 1884.
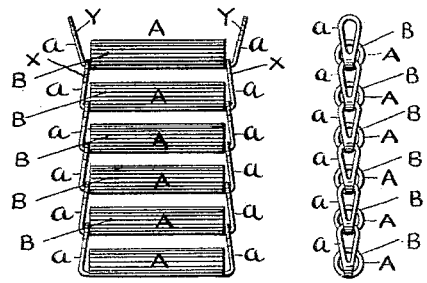
FIG. 1.
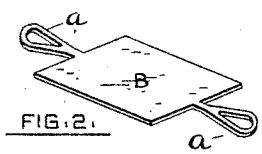 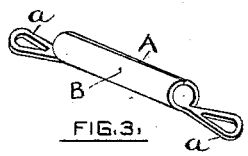 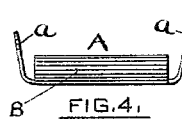 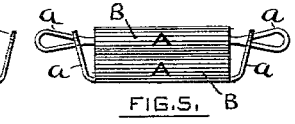
FIG. 2.   FIG. 3.   FIG. 4.   FIG. 5.
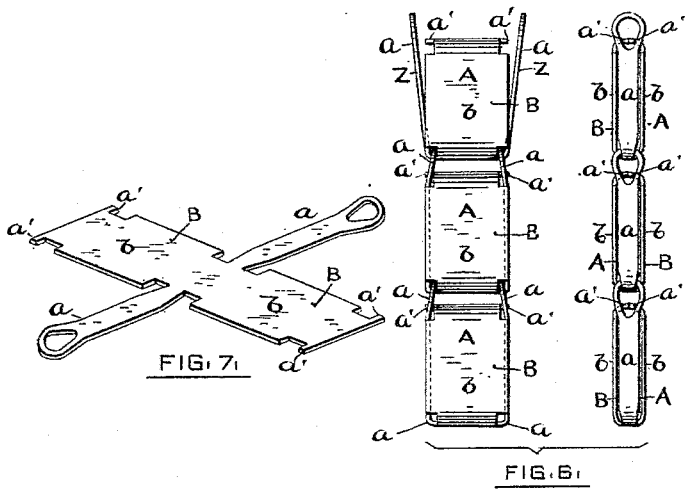
WITNESSES.
Henry J. Stapleton.
Geo. W. Cady.
INVENTOR
Frank Fontneau
by Edson Salisbury Jones
Attorney.
N. PETERS. Photo-Lithographer. Washington. D. C.

UNITED STATES PATENT OFFICE.

FRANK FONTNEAU, OF ATTLEBOROUGH, MASSACHUSETTS.

ORNAMENTAL CHAIN.

SPECIFICATION forming part of Letters Patent No. 300,241, dated June 10, 1884.

Application filed March 17, 1883. (No model.)

*To all whom it may concern:*

Be it known that I, FRANK FONTNEAU, of Attleborough, in the county of Bristol and State of Massachusetts, have invented a new and useful Improvement in Ornamental Chains; and I do hereby declare that the following specification, taken in connection with the accompanying drawings, forming a part of the same, is a full, clear, and exact description thereof.

This invention consists in an ornamental chain for bracelets, necklaces, &c., which is composed of links having perforated tang portions by which the links are connected together, as will hereinafter appear.

Referring to the drawings, Figure 1 represents front and side views of a portion of a chain embodying the invention. Fig. 2 shows in perspective the form of the sheet-metal blanks from which the links of said chain are made. Fig. 3 represents in perspective a link partially formed from such a blank. Fig. 4 shows the link with its tang portions bent into position to receive another link. Fig. 5 represents two links partially combined. Fig. 6 shows front and side views of a chain embodying the invention, the links of which are substantially rectangular in outline. Fig. 7 represents in perspective the form of the sheet-metal blanks from which the links of said chain are made. Fig. 8 shows in perspective a link made from such a blank, one of the tangs being removed.

The links A of my improved chain are made from blanks punched from sheet metal, the perforated tang portions $a$ being integral with the body portions B of the links and projecting from their ends or sides.

In making the chain shown in Fig. 1, the links of which are substantially hollow cylinders, the body B of the link is formed by swaging the body of the blank into tubular form, as shown in Fig. 3. The tangs $a\ a$ are then bent upwardly, as shown in Fig. 4, and a second link is combined with the first by passing the tangs of the former through the perforations in the tangs of the latter, as shown in Fig. 5. The second link is then turned one-fourth of a revolution, the tangs of the first link are closed into a position shown at $x$, Fig. 1, and the tangs of the second link are bent upwardly into the position shown in Fig. 4 and at Y, Fig. 1. In this manner successive links are connected to form a chain of any desired length.

Instead of the links being substantially cylindrical in form, the body portions may have an oval, rectangular, triangular, or other preferred outline in cross-section, and instead of being made of sheet metal bent into such forms, the link-bodies may be solid and the perforated tang portions $a$ be swaged upon their ends or sides; or the tangs of any preferred design may be soldered or otherwise rigidly secured to such portions of the link-body.

The links of the chain shown in Fig. 6 are substantially rectangular in outline, both longitudinally and transversely. This chain is made from link-blanks of the form shown in Fig. 7, a link being formed by bending the wings $b\ b$ of the blank-body into the relative positions shown in Fig. 8, and by bending the tangs $a\ a$ into the positions shown at $z$, Fig. 6. The links of this chain are combined substantially in the manner already described with relation to the chain shown in Fig. 1.

In order to prevent the wings $b\ b$ of the link-body from becoming separated at their upper ends after the chain is complete, said ends are provided with studs or projections $a'$, which enter the perforations in the tangs $a\ a$, as shown in Fig. 6, when the tangs are bent into final position, and thereby prevent said wings from being separated accidentally or by force.

If desired, the links shown in Fig. 1, and links of other forms described, may be provided with the studs or projections $a'$, and the perforations in the tangs of such links be adapted to receive said studs, for the purposes specified.

My improved chain has the advantages of being simple and inexpensive in construction and possessing great strength and durability.

What I claim, and desire to secure by Letters Patent, is—

1. An ornamental chain composed of links having the ends or sides of their body portions provided with perforated tangs $a$, which are hooked together to connect the links, substantially as set forth.

2. An ornamental chain composed of folded sheet-metal links, having the ends or sides of their body portions provided with integral perforated tangs $a$, which tangs are hooked together to connect the links, substantially as set forth.

3. An ornamental chain composed of folded sheet-metal links having perforated tangs $a$ upon the ends or sides of their body portions, and such body portions provided with studs or projections $a'$, which enter the perforations in said tangs and prevent the link-body from being opened, substantially as set forth.

FRANK FONTNEAU.

Witnesses:
EDSON SALISBURY JONES,
GEO. W. CADY.